United States Patent
Helwig

[19]

[11] Patent Number: 5,801,473
[45] Date of Patent: Sep. 1, 1998

[54] OPEN STATOR AXIAL FLUX ELECTRIC MOTOR

[75] Inventor: Andreas Helwig, Via Toowoomba, Australia

[73] Assignee: Queensland Rail, Brisbane, Australia

[21] Appl. No.: 637,705

[22] PCT Filed: Sep. 7, 1995

[86] PCT No.: PCT/AU95/00586

§ 371 Date: Apr. 30, 1996

§ 102(e) Date: Apr. 30, 1996

[87] PCT Pub. No.: WO96/09680

PCT Pub. Date: Mar. 28, 1996

[30] Foreign Application Priority Data

Sep. 20, 1994 [AU] Australia ............... PM8270

[51] Int. Cl.$^6$ .................. H02K 1/12; H02K 1/18; H02K 17/00; H02K 17/12

[52] U.S. Cl. ................ 310/254; 310/114; 310/166; 310/168; 310/218; 310/254; 310/258; 310/266; 310/268

[58] Field of Search ............... 310/114, 166, 310/168, 179, 180, 184, 185, 254, 258, 268, 157, 218, 266

[56] References Cited

U.S. PATENT DOCUMENTS

| | | | |
|---|---|---|---|
| 3,539,847 | 11/1970 | Gifford | 310/49 |
| 3,867,656 | 2/1975 | Mitsui et al. | 310/68 |
| 4,007,386 | 2/1977 | Rustecki | 310/42 |
| 4,031,419 | 6/1977 | Spiesberger et al. | 310/49 R |
| 5,028,830 | 7/1991 | Mas | 310/211 |
| 5,168,187 | 12/1992 | Baer et al. | 310/49 R |
| 5,194,796 | 3/1993 | Domeki et al. | 318/696 |
| 5,226,791 | 7/1993 | Miwa et al. | 415/216.1 |
| 5,293,093 | 3/1994 | Warner | 310/254 |

FOREIGN PATENT DOCUMENTS

| | | | |
|---|---|---|---|
| 42465/72 | 11/1973 | Australia | 310/266 |
| 63779/73 | 6/1975 | Australia | 310/266 |

Primary Examiner—Thomas M. Dougherty
Assistant Examiner—Karl Tamai
Attorney, Agent, or Firm—Panitch Schwarze Jacobs & Nadel, P.C.

[57] ABSTRACT

An open stator axial flux asynchronous induction electric motor has an open stator having two spaced insulating supports with a slot extending from a periphery of each of the supports to an inner location. A plurality of poles extend between and are secured to the supports. The stator has either distributed winding or salient phase pole windings associated with at least some of the poles with an opening between adjacent poles in the regions of the slots in the supports. The motor has a rotor with a shaft extending through the slots and at right angles to the supports. Two spaced rotor discs are present on the shaft and are located at either side of the stator. Each disc is made of a magnetically permeable material and has either an inner face of electrically conductive material or an inner face with conductive paths which function as rotor windings.

20 Claims, 9 Drawing Sheets

OPEN STATOR AXIAL FLUX ELECTRIC MOTOR

FIELD OF THE INVENTION

This invention relates to an electric machine. In particular, the invention concerns an open stator axial flux electric (OSAF) motor.

The invention will be described by way of example with reference to a preferred application or use of the motor. This preferred use or application employs the motor of the invention as a traction motor for driving a railway bogie. It should be appreciated that this is by way of example only and that the motor of the invention may be employed in other applications and for other purposes.

BACKGROUND OF THE INVENTION

Traction motors for rail bogies in recent times typically are three phase asynchronous motors powered by an inverter controlled bridge providing a three phase AC voltage of about 750 to 2000 VAC depending upon the particular traction system used.

Such traction motors have a stator and a rotor with the rotor operating at relatively high speeds.

Electronic converters/inverters (e.g. pulse width modulation) are used to develop the variable frequency traction drive three phase supply to power and control the motor. The motor is typically of a squirrel cage design. The high speed range is necessary to take advantage of the high torque characteristic at high rotational speed of conventional three phase machines.

High motor speed over 4000 rpm and up to 6500 rpm requires special bearing design and lubrication attention for heavy engineering, marine and traction applications. Difficulties arise with low starting speed, lubricant film levels and over-lubrication and heating at the high speed. Shorter bearing life and shorter maintenance periods for bearing lubrication are a reality.

High motor speed requires expensive drive train and gear box design. It is time consuming and expensive to change an element of a drive system e.g. wheel or motor in a rail traction system.

Traction motor construction is such that there is no stator case or housing and the stator laminations form the body of the motor. A catastrophic rotor failure or a stator winding failure may require complete replacement of the motor.

SUMMARY OF THE INVENTION

It is an object of the invention to provide an improved electric motor for use as a drive system, e.g. a traction motor for railway bogies.

According to one aspect the invention provides an open stator axial flux asynchronous induction electric motor including:

an open stator including two spaced insulating supports with a slot extending from a periphery of each of the supports to an inner location thereof, a plurality of poles with pole pieces extending between the supports and secured thereto, the pole pieces being made of magnetically permeable material and arranged along a circular path around the supports, the stator having either distributed windings or salient phase pole windings associated with at least some of the pole pieces with an opening between adjacent pole pieces in the region of the slots in the supports;

a rotor having a shaft locatable in and extending through the slots and extending at right angles to the supports, two spaced rotor discs on the shaft with a respective said disc located on the shaft and either side of the stator, each disc being constructed of magnetically permeable material and having either an inner face of electrically conductive material or an inner face with conductive paths providing rotor windings, the shaft being supported for rotation relative to the rotor.

The shaft which forms part of the rotor is preferably made from a non-magnetically permeable material. In this way the flux linkage paths from one of the rotor discs to the other of the rotor discs are minimised and the magnetic paths are contained within the discs and the stator poles. Fringing and losses may be reduced by such a choice of shaft material. In one embodiment the shaft is made from an austenitic stainless steel although other non-magnetically permeable materials may also be used e.g. the relative permittivity of about 1.03 for austenitic stainless steel is particularly preferred.

As mentioned, the rotor discs may have an inner electrically conductive layer or have an inner face capable of providing conductive paths to form rotor windings. A particular preferred conductive layer may be provided by forming each disc of magnetically permeable material faced with a sheet of copper on an inner face thereof. The discs may be made of cast steel and the copper layer may be of a thickness of between 1 to 6 mm although other suitable thicknesses are not excluded. The copper layer may be secured in place in any suitable fashion such as for example by silver solder or T.I.G. welding, or in fact the layer itself may be manufactured by using continuous T.I.G. welding in a spiral and then machining the weld to provide a flat surface.

Although the conductive layer mentioned above is referred to as being copper, other electrically conductive metals such as aluminium may also be used.

As an alternative to providing a layer of electrically conductive material on the inner face of the rotor discs to form the rotor windings, the following configurations may be adopted. The inner face of the discs may be provided by a radially inner and a radially outer conductive shorting rings of electrically conductive material provided on the inner face of the rotor discs with substantially radially extending electrically conductive bars extending between the shorting rings. Such a configuration may be thought of as being analogous in function and purpose to a squirrel cage rotor construction employed in a typical squirrel cage induction machine. If desired, the radially extending bars may either extend exactly radially of the discs or may be skewed to that radial direction to reduce torque pulsation in use.

The open stator, as mentioned, has poles provided by pole pieces either having distributed windings or salient pole windings. The motor of the invention may have three pole phase groups as a minimum although a greater number is preferred. The number of pole phase groups employed may either be even or uneven. The term "open stator" denotes the fact that there are no poles in a sector of the circular path about which the poles are located. This fact together with the provision of a slot in each of the supports for the poles enables the rotor shaft to be received and located within the slots provided in the supports and within the open sector during operation of the motor. Likewise, the rotor is readily separable from the stator and can readily be removed from the stator if required.

Preferably there are more than three pole phase groups. In one embodiment a six pole motor is preferred although a seven pole motor is particularly preferred.

Each individual coil pole of a phase group includes a pole piece of magnetically permeable material. It is preferred that the pole pieces be substantially wedge shaped and made of a plurality of pieces laminated to each other. However laminated rectangular pole pieces may be used for complex distributed windings. By having the poles made of laminations eddy current losses may be reduced. The poles are preferably made of laminated silicon steel pieces or wedges.

It is not necessary that all poles be excited. Thus, the poles immediately adjacent the vacant sector need not be excited. As mentioned, the windings may either be distributed windings or salient pole windings with any unexcited poles being located adjacent the open ends of the stator. It is preferred that the number of windings be present in multiples of three. For example the number of windings may comprise a six pole stator with four phase groups, a seven pole stator with five phase groups or any other suitable configuration. It is particularly preferred that an odd number of poles be employed and that the pole pieces adjacent the open sector be unexcited.

The pole pieces are preferably longer than the coils are high. This enables the pole pieces to be more easily secured to the supports. One way of securing the pole pieces to the supports is to provide the supports with wedge shaped apertures into which ends of the pole pieces may project and the pole pieces may be clamped between the two supports.

BRIEF DESCRIPTION OF THE DRAWINGS

Preferred embodiments of the invention will now be described with reference to the drawings in which.

DETAILED DESCRIPTION OF THE INVENTION

Figure 1:
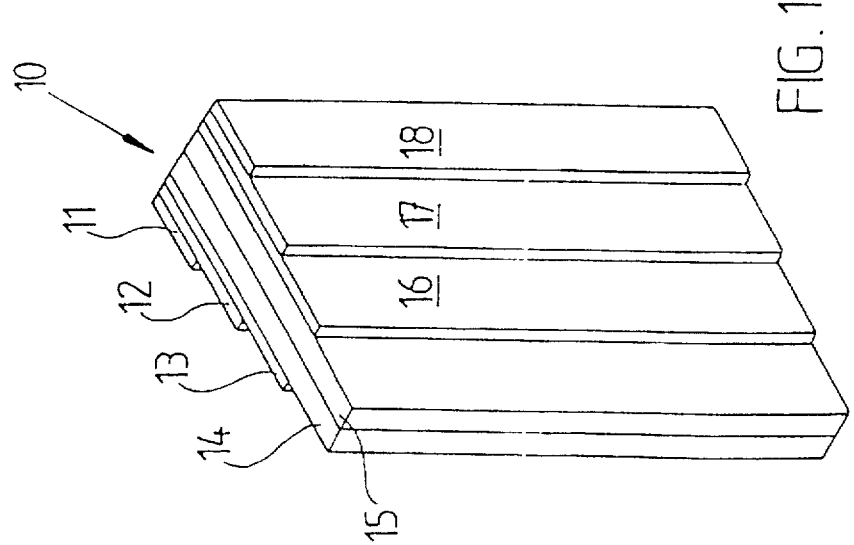
FIG. 1 is a perspective view of a pole piece according to an embodiment of the invention.

FIG. 1 shows a preferred construction of a wedge shaped pole piece 10. The pole piece is comprised of laminations 11 to 18 and as a compromise, these laminations are plate like in configuration to provide an approximation to a wedge shape.

Figure 2:
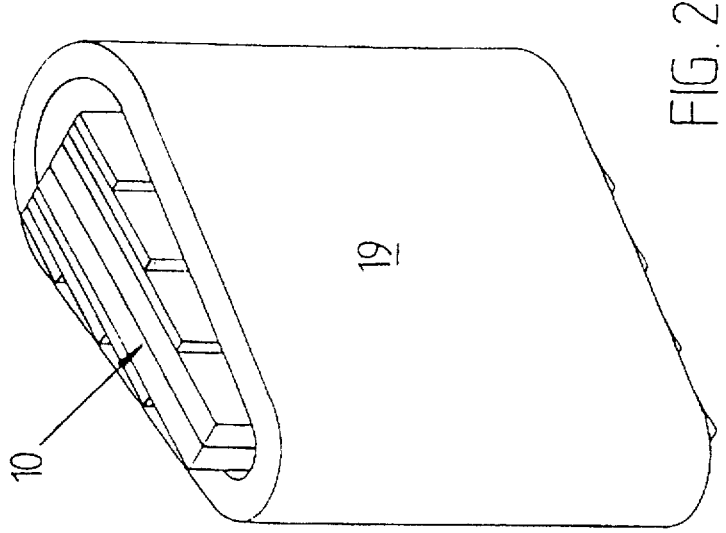
FIG. 2 is a perspective view of the pole piece of FIG. 1 with a salient pole winding.

FIG. 2 shows the pole piece 10 with a salient pole winding 19 extending around it. The pole piece 10 extends a short distance beyond opposed ends of the winding 19 for reasons explained below.

Figure 3:
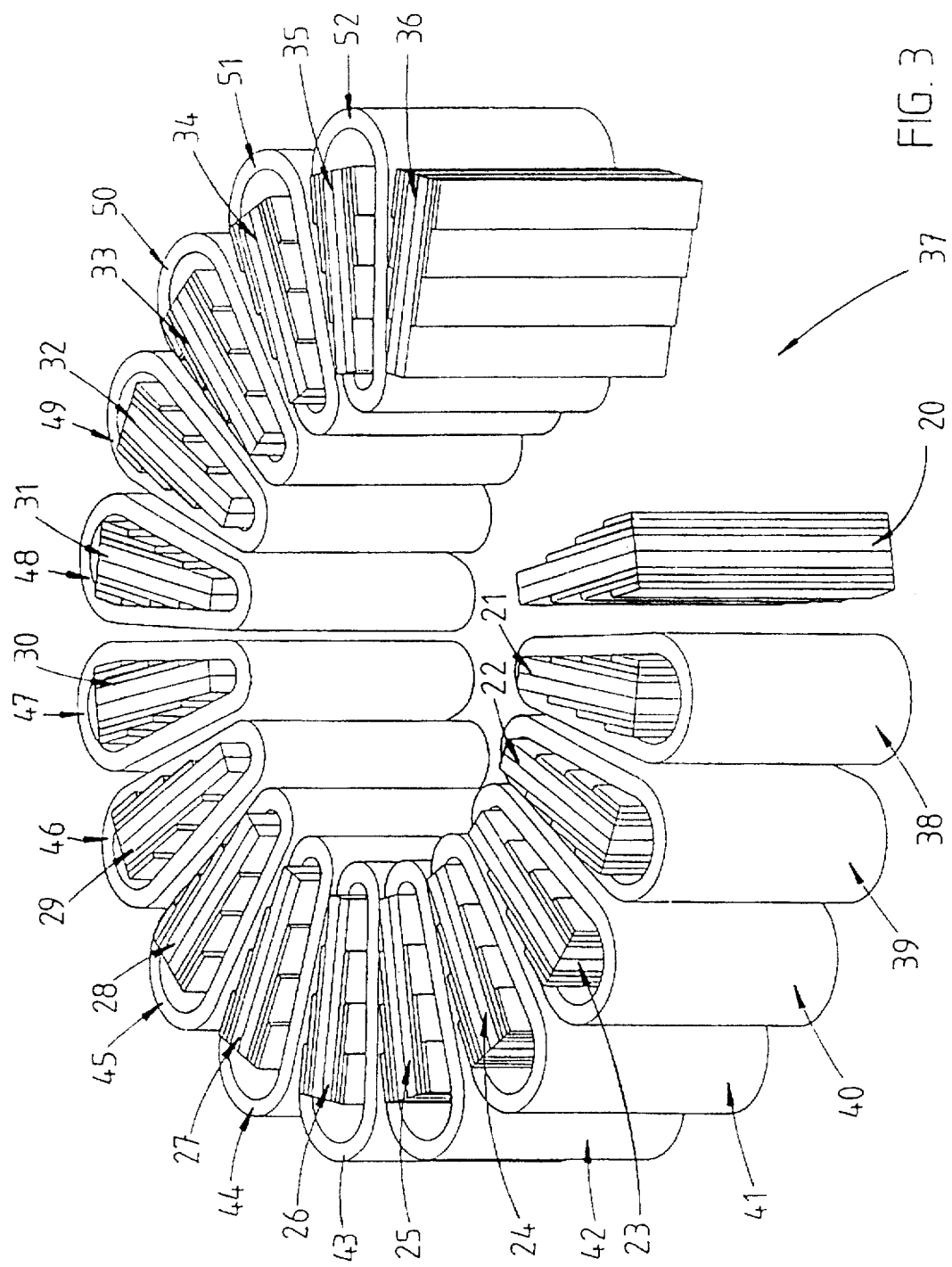
FIG. 3 is a perspective view of a plurality of pole pieces showing the configuration adopted for an open stator axial flux motor having seven pole groups of three phases (five active poles)

FIG. 3 shows the manner in which a plurality of pole pieces 20 to 36 are arranged around a circular path with an open sector 37 to provide a seven pole motor having five active coil phase groups. Pole pieces 20 and 36 adjacent the open sector 37 are unexcited and salient pole windings 38 to 52 are associated with pole pieces 21 to 35 respectively. Thus, the number of salient wound coils are a multiple of three. The salient pole windings employ a three phase driving current to develop a rotating magnetic field.

A study conducted of anticipated magnetic main (useful) and leakage flux paths for a six pole OSAF motor (i.e. four active coil phase groups) and a seven pole OSAF motor (i.e. five active coil phase groups) has been carried out to determine whether an odd or even number of phase coil should be used and to establish the losses due to the open stator configuration. This study revealed that, as expected, leakage flux path losses were high in the open ends as the phase coil polarity was opposite on each of the open stator ends in a six pole OSAF motor. Similarly losses occurred due to the magnetic bridge formed by the rotor shaft if made of ferromagnetic material. Normal fringing losses occur on the outer disc edges and between the phase coils.

By employing an odd number of poles for the open stator the coil phase groups adjacent the opening in the stator are of the same polarity and this reduces the open end flux path loss. To convert the leakage around the end coil a non-excited laminated pole piece is used adjacent either side of the opening in the stator. This converts the flux into a useful path through the rotor discs. To further reduce losses, as previously mentioned, the rotor shaft should be made of a non-ferromagnetic material such as an austenitic stainless steel with a relative permittivity of about 1.03.

Figure 4:
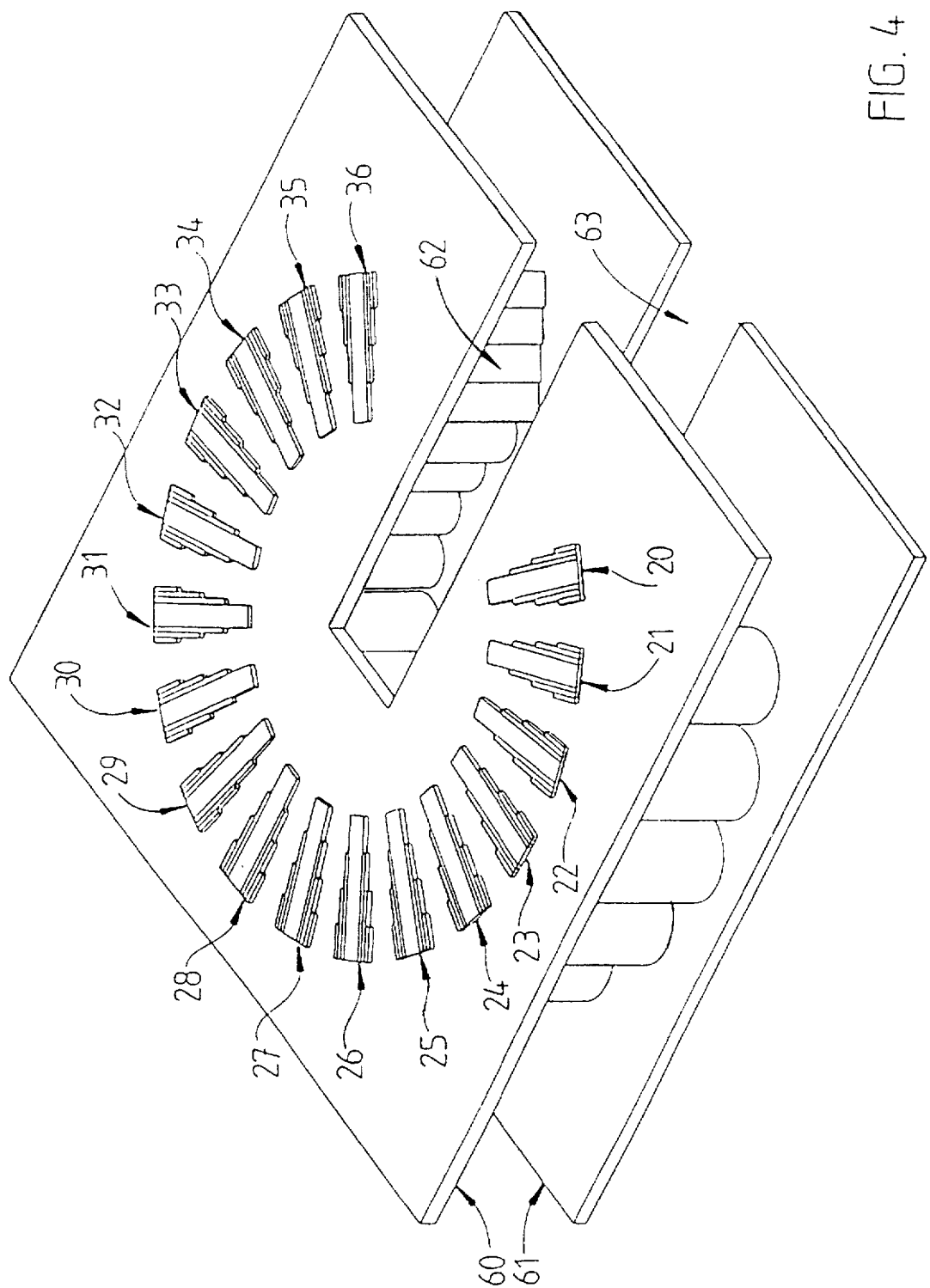
FIG. 4 is a perspective view of the pole pieces of FIG. 3 secured to supports.

FIG. 4 shows the pole pieces 20 to 36 mounted to opposed stator supports 60, 61. Each support 60, 61 has apertures into which the pole pieces project. The supports are clamped together against the salient pole windings. The supports are made of insulating material and are each provided with a slot 62, 63 at a location next to the opening between the non-excited pole pieces 20, 36.

Figure 5:
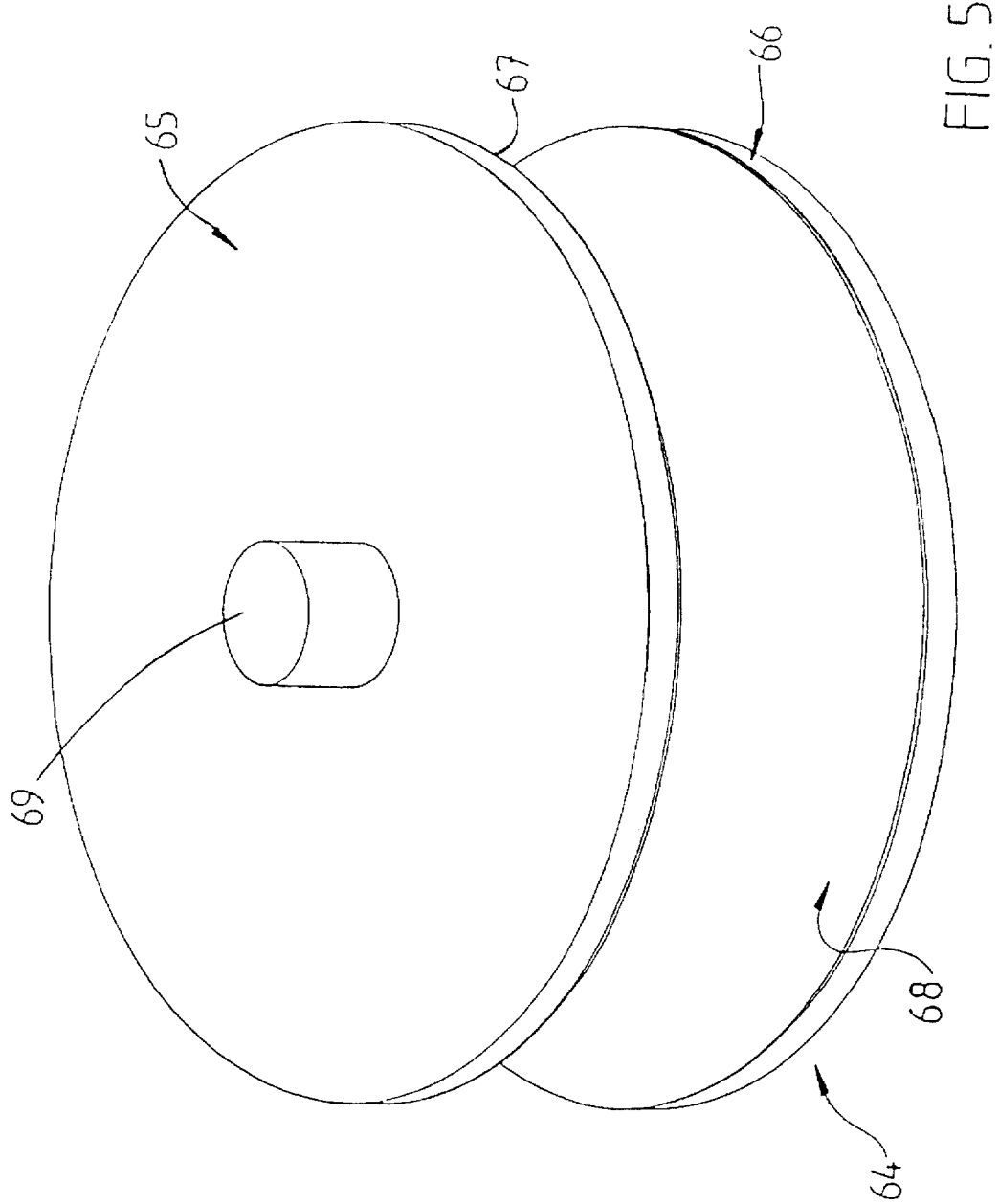
FIG. 5 is a perspective view of a rotor according to a preferred embodiment of the invention.

FIG. 5 shows a perspective view of a rotor 64. The rotor has two rotor discs 65, 66 made magnetically permeable cast steel. Each disc has an inner surface faced with a circular sheet of copper 67, 68 and a shaft 69 extending through and beyond the outer faces of the discs. In use, the stator shown in FIG. 4 is received between the discs with the shaft 69 extending through the slots 62, 63.

Figure 6:
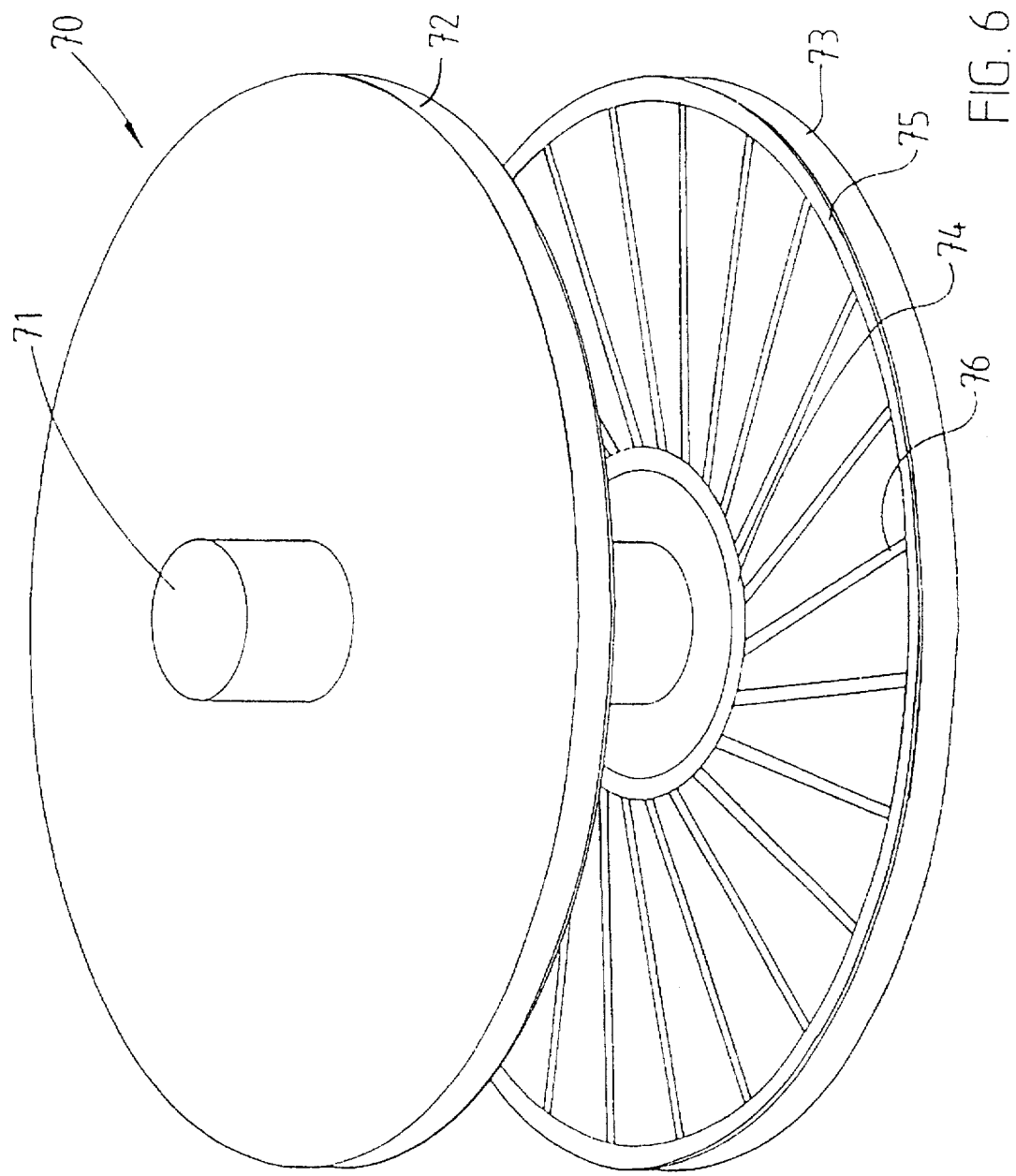
FIG. 6 is a perspective view of a rotor according to another embodiment of the invention.

The rotor 70 in FIG. 6 has a shaft 71 and two spaced rotor discs 72, 73. In this embodiment, rather than having the discs 72, 73 provided with a conductive layer as described in relation to FIG. 5, the discs are provided with rotor windings consisting of an inner and an outer shorting rings 74, 75. Conductive bars 76 extend between the rings 74, 75. Although the bars 76 may extend radially of the discs, in this embodiment the bars are skewed as shown to reduce torque pulsations in use. The bars and rings may be embedded into the discs and need not necessarily be visible when the rotor is configured in this way.

Figure 7:
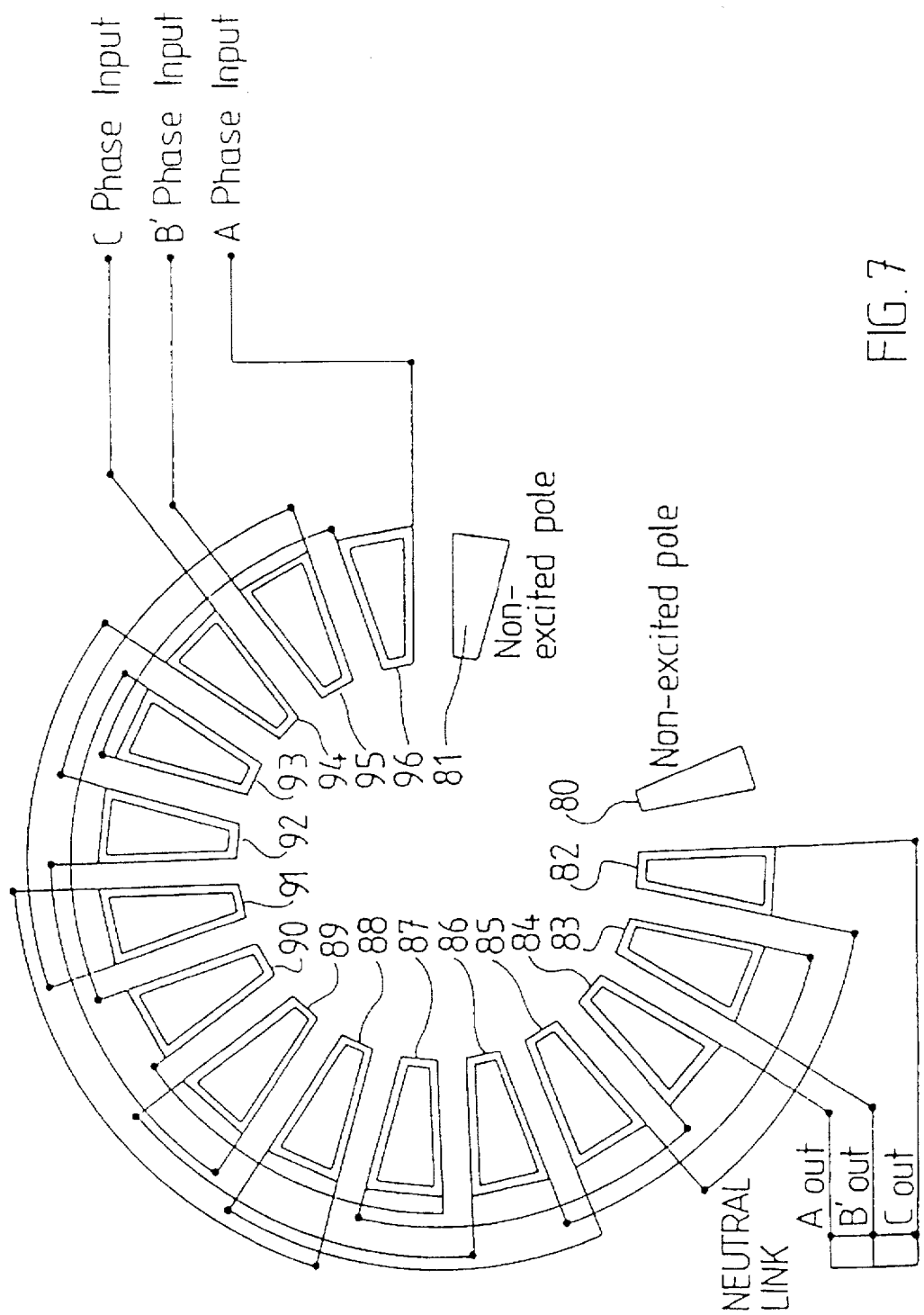
FIG. 7 is a winding diagram for a salient pole OSAF motor according to an embodiment of the invention.

FIG. 7 shows one way in which the stator of the invention may be wound. In this figure, the stator has two non excited poles 80, 81. The remaining poles 82 to 96 are excited with respective ones of the phase currents A, B or C in the manner illustrated.

Figure 8:
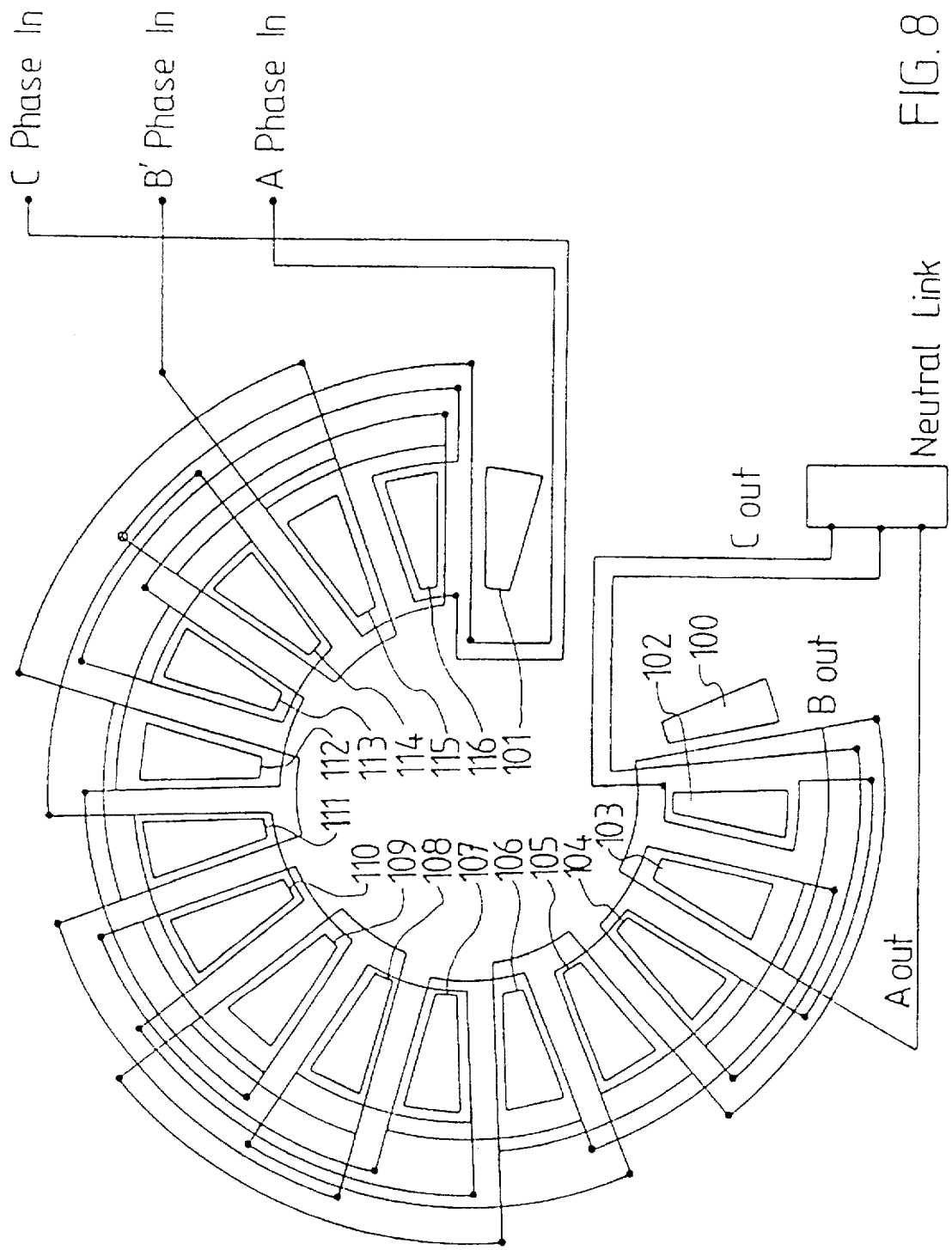
FIG. 8 is a winding diagram for a distributed pole OSAF motor according to an embodiment of the invention.

FIG. 8 shows one way in which the stator of the invention may be wound. In this figure, the stator has two non excited poles 100, 101. The remaining poles 102 to 116 are excited with distributed windings supplied with current from phases A, B and C.

Figure 9:
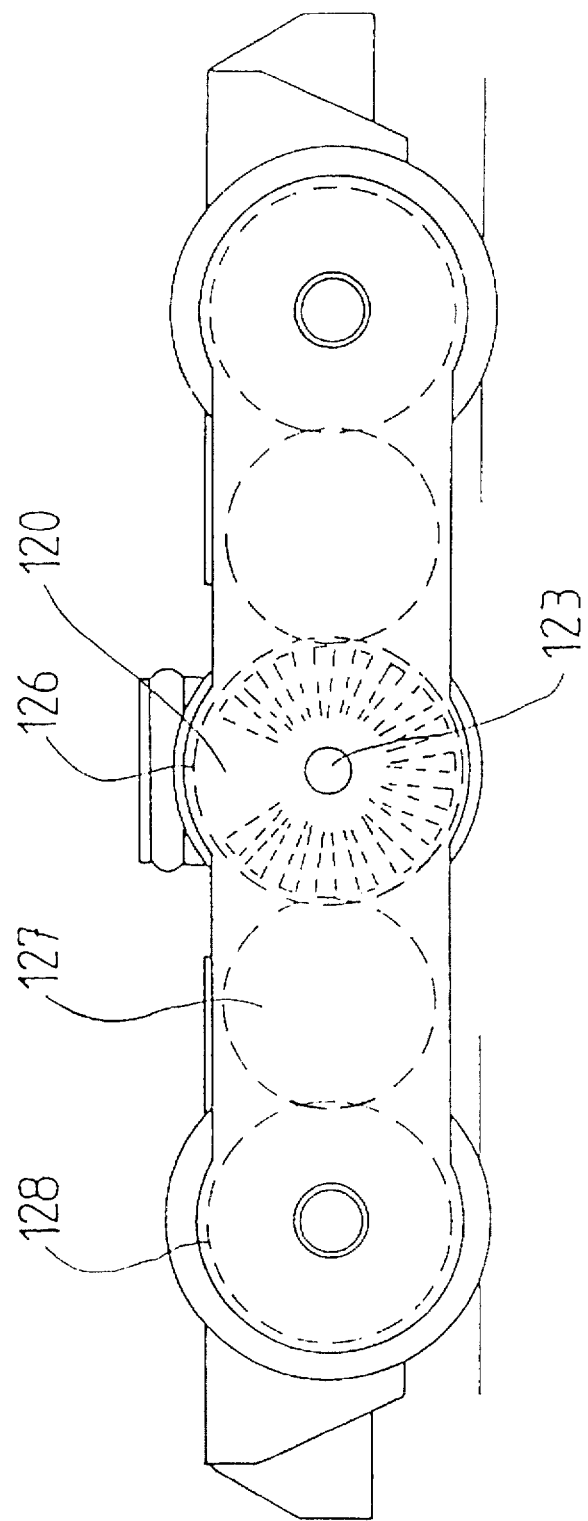
FIG. 9 is an elevational view of a railway bogie incorporating a motor according to an embodiment of the invention.
Figure 10:
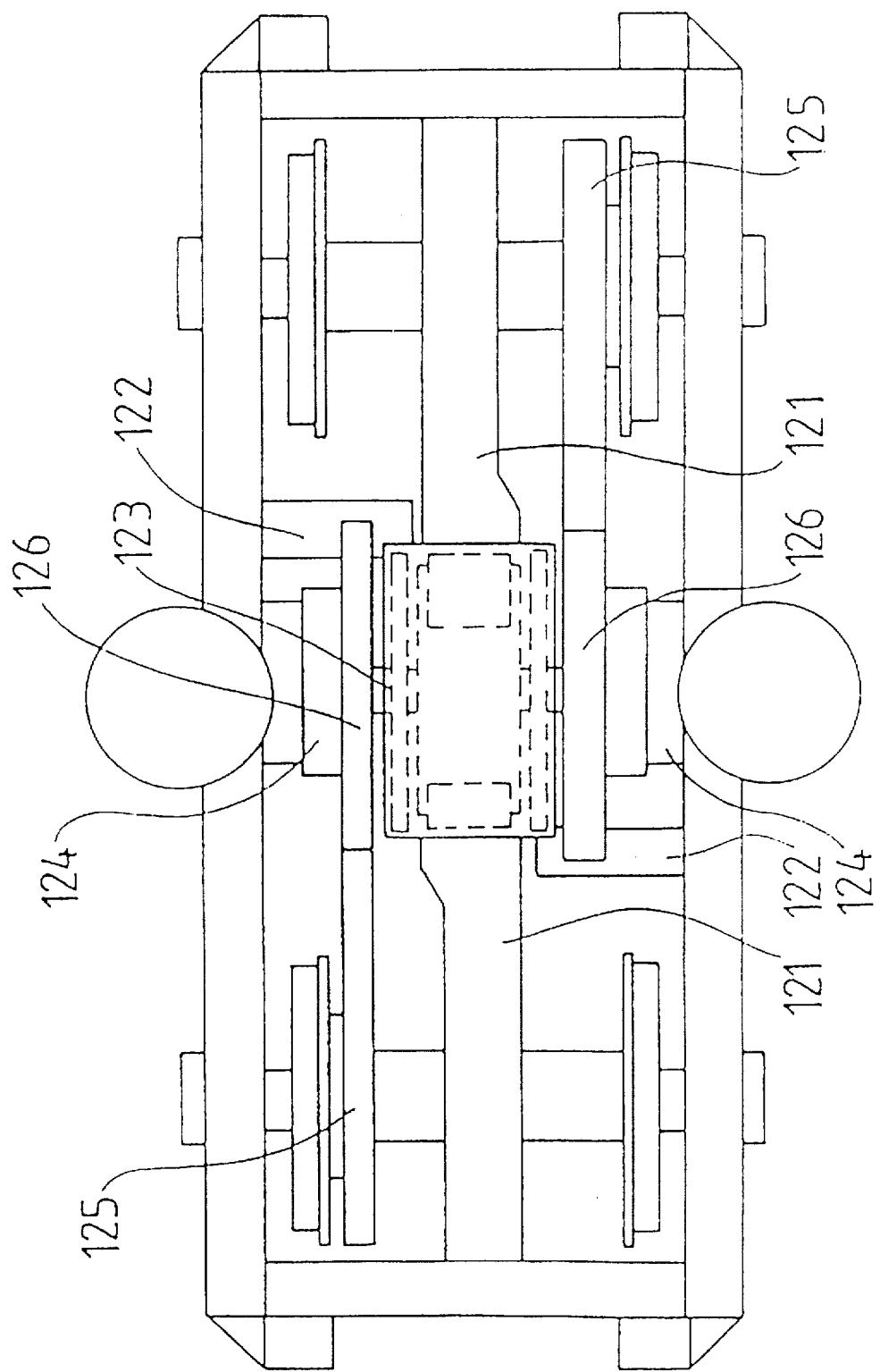
FIG. 10 is a plan view of the bogie shown in FIG. 9.

FIGS. 9 and 10 are useful in understanding how the motor of the invention is employed in a railway bogie. Although FIG. 9 is a side elevational view of a bogie which has the motor 120 mounted between two transversely spaced bogie frame members, the motor is shown in dark outline to indicate its position relative to the bogie. Normally the motor would be obscured from view by one of the transverse frame members.

The motor 120 is positioned such that the slots in the stator and the gap between the poles near the slots is uppermost. The motor 120 is supported and mounted to the bogie by a support frame 121 and support beams 122. Part of the frame 121 has been removed for the sake of clarity. That part normally extends above the motor and has a keeper secured to a portion of the stator adjacent the slots in the stator.

The rotor shaft 123 and the rotor discs are clearly visible in FIG. 10. Opposite ends of the shaft 123 are supported in bearings 124. Gearboxes 125 are secured to opposite sides of the bogie and consist of a primary drive gear 126 on the rotor shaft, an intermediate drive gear 127 supported by the gearbox and a final gear/cardon quill shaft 128.

If it proves necessary to remove the stator from the bogie the following steps are necessary. The stator is supported from below and the lateral support beams 122 and the support frame and keeper 129 are disconnected from the stator. The stator may then be lowered and removed. The rotor remains in position relative to the bogie and need not be disconnected from the gearbox or bearings.

If it proves necessary to remove the rotor then the rotor needs to be decoupled from the bearings and gearbox and separated from the bogie. The stator is able to remain securely coupled to the bogie and does not need to be disturbed.

The diameter of the rotor discs is preferably chosen to be greater than the diameter about which the poles on the stator are located. In this way the discs extend past the stator pole radius. This allows the induced loop currents of the rotor to return outside the main stator magnetic flux. Therefore with such a configuration there is a reduction in the development of counter motive forces between the rotor and the stator.

A similar effect is also possible where, rather than the discs having conductive faces, they are provided with conductive shorting rings and conductive bars extending between the rings. With such a construction the rings should be outside the radius of the poles.

The OSAF motor is of a relatively simple construction. The rotor and stator can be changed and handled separately in its example application with a railway bogie. If stator failure occurs, the rotor and associated drive gear train do not need to be disturbed during stator change-over or stator individual coil replacements. A motor constructed in accordance with the present invention has a lower running speed than a design having more poles for a similar volume. The motor has a field rotation (rpm) of $$\frac{2 \times \text{supply frequency} \times 60}{N}$$

where N=number of stator three phase coil/pole groups in an imaginary full stator annulus (i.e. as if the motor were a full axial flux stator.

The torque developed by the motor of the invention is developed at a larger force radius to compensate for lower operating speeds. The lower operating speeds place less constraints on the bearings and drive gear train and this allows for a simpler design for the bearings and gear train.

Since there is no need for stationary back iron in the stator it is almost impossible to have a phase to earth failure and because less material is employed in the construction of the motor a weight saving is possible. For a salient pole stator winding design (as opposed to a distributing winding design) it is almost impossible to have phase to phase failures because each phase is physically separated.

The stator of the motor according to the invention requires no stationary back iron and this reduces losses.

I claim:

1. An open stator axial flux asynchronous induction electric motor comprising:

an open stator including two spaced non-magnetic insulating supports with a slot extending from a periphery of each of the supports to an inner location thereof, a plurality of poles with pole pieces extending between the supports and secured thereto, the pole pieces being constructed of magnetically permeable material and arranged along a circular path around the supports, the stator having windings associated with at least some of the pole pieces with an opening between adjacent pole pieces in the region of the slots in the supports;

a rotor having a shaft located in and extending through the slots and extending at right angles to the supports, two spaced rotor discs on the shaft with a respective said disc located on the shaft and either side of the stator, each disc being constructed of magnetically permeable material and having either an inner face of electrically conductive material, or an inner face with conductive paths providing rotor windings, the shaft being supported for rotation relative to the rotor.

2. The open stator axial flux electric motor of claim 1 wherein the rotor shaft is constructed from a non-magnetically permeable material.

3. The open stator axial flux electric motor of claim 2 wherein the shaft is made from austenitic stainless steel.

4. The open stator axial flux electric motor of claim 1 wherein an inner face of each of the discs has a layer of copper secured to it.

5. The open stator axial flux electric motor of claim 4 wherein the layer of copper is between about 1 to about 6 mm thick.

6. The open stator axial flux electric motor of claim 1 wherein the conductive paths are provided by a radially inner and a radially outer conductive shorting rings with substantially radially extending conductive bars extending between the shorting rings.

7. The open stator axial flux electric motor of claim 6 wherein the radially extending bars are skewed slightly relative to a radial direction on the discs to thereby reduce torque pulsation when the motor is operating.

8. The open stator axial flux electric motor of claim 1, wherein the motor has an uneven number of pole phase groups.

9. The open stator axial flux electric motor of claim 8, wherein the motor has at least three pole phase groups.

10. The open stator axial flux motor of claim 1 wherein there are at least six said poles made of a magnetically permeable material.

11. The open stator axial flux motor of claim 10 wherein the pole pieces are wedge shaped and made of a plurality of pieces laminated to one another.

12. The open stator axial flux motor of claim 11 wherein the poles are made of laminated silicon steel.

13. The open stator axial flux motor of claim 1 wherein the poles immediately adjacent the opening in the stator are unexcited.

14. The open stator axial flux motor of claim 13 having windings for exciting the poles being present in a number being a multiple of three.

15. The open stator axial flux motor of claim 1, wherein the stator has six poles with four phase groups.

16. The open stator axial flux motor of claim 1, wherein the stator has seven poles with five phase groups.

17. The open stator axial flux motor of claim 1, wherein the stator has an odd number of poles and the poles adjacent the slot in the stator are unexcited.

18. The open stator axial flux motor of claim 1 wherein the pole pieces are longer than the height of the windings such that the pieces extend beyond the windings.

19. The open stator axial flux motor of claim 1 wherein the stator has distributed windings.

20. The open stator axial flux motor of claim 1 wherein the stator has salient phase pole windings.

* * * * *